US011306175B2

(12) United States Patent
Smits et al.

(10) Patent No.: US 11,306,175 B2
(45) Date of Patent: Apr. 19, 2022

(54) POLYMER COMPOSITION COMPRISING AN IMPACT MODIFIER AND METHOD OF MAKING THE SAME

(71) Applicant: Croda International Plc, Goole (GB)

(72) Inventors: Angela Leonarda Maria Smits, Zeist (NL); Johannes Rutger Idsard Knoop, Wijk bij Duurstede (NL)

(73) Assignee: Croda International PLC, Goole (GB)

( * ) Notice: Subject to any disclaimer, the term of this patent is extended or adjusted under 35 U.S.C. 154(b) by 17 days.

(21) Appl. No.: 16/062,265

(22) PCT Filed: Nov. 3, 2016

(86) PCT No.: PCT/GB2016/053410
§ 371 (c)(1),
(2) Date: Jun. 14, 2018

(87) PCT Pub. No.: WO2017/109451
PCT Pub. Date: Jun. 29, 2017

(65) Prior Publication Data
US 2018/0362700 A1    Dec. 20, 2018

(30) Foreign Application Priority Data

Dec. 22, 2015 (GB) .................................... 1522585

(51) Int. Cl.
| | | |
|---|---|---|
| C08G 18/42 | (2006.01) | |
| C09D 175/06 | (2006.01) | |
| C09J 175/06 | (2006.01) | |
| C08G 18/73 | (2006.01) | |
| C08G 18/76 | (2006.01) | |
| C08G 18/79 | (2006.01) | |
| C08G 18/72 | (2006.01) | |
| C08J 5/18 | (2006.01) | |

(52) U.S. Cl.
CPC ....... *C08G 18/4202* (2013.01); *C08G 18/428* (2013.01); *C08G 18/4233* (2013.01); *C08G 18/4286* (2013.01); *C08G 18/4288* (2013.01); *C08G 18/722* (2013.01); *C08G 18/73* (2013.01); *C08G 18/7664* (2013.01); *C08G 18/7671* (2013.01); *C08G 18/792* (2013.01); *C08J 5/18* (2013.01); *C09D 175/06* (2013.01); *C09J 175/06* (2013.01); *C08J 2375/06* (2013.01)

(58) Field of Classification Search
CPC ............ C08G 18/4202; C08G 18/4233; C08G 18/428; C08G 18/4288; C08G 18/4286; C08G 18/722; C08G 18/73; C08G 18/7671; C08G 18/792; C08J 5/18; C08J 175/06; C09D 175/06

See application file for complete search history.

(56) References Cited

U.S. PATENT DOCUMENTS

2006/0030690 A1 * 2/2006 Mihara .................. C08L 67/04
528/272

FOREIGN PATENT DOCUMENTS

| CN | 103450649 | * | 12/2013 | ............. B29C 48/40 |
| JP | 2002097350 | * | 4/2002 | ................ C08L 7/00 |
| WO | WO-2008067967 A2 | * | 6/2008 | ............. C08G 18/68 |
| WO | 2012038441 A1 | | 3/2012 | |
| WO | 2014191131 A1 | | 12/2014 | |
| WO | 2015044638 A1 | | 4/2015 | |

OTHER PUBLICATIONS

CN-103450649, Dec. 2013_English.*
Material Selection for Thermoplastic Parts, Michael Biron, 2015, p. 318.*
Difference Between Izod and Charpy Methods, Ian F. pp. 1-6. Jan. 7, 2010. http://www.differencebetween.net/science/difference-between-izod-and-charpy-methods/.*
JP_2002097350_04-2002_English Translation.*
Breuer, et al., "Dimer Acids", Kirk-Othmer Encyclopedia of Chemical Technology, pp. 1-13 (Dec. 4, 2000).
Dogan, S.K., et al., "Reactive Compatibilization of PLA/TPU Blends with a Diisocyanate," May 14, 2014, App. 40251 (pp. 1-10), vol. 131, Issue 10, Journal of Applied Polymer Science.
International Search Report and Written Opinion for International Application No. PCT/GB2016/053410, dated Feb. 9, 2017—8 pages, 2018.
Imre et al., "Structure, Properties and Interfacial Interactions In Poly)Lactic Acid)Polyurethane Blends Prepared by Reactive Processing", European Polymer Journal, vol. 49, Issue 10, 2013, 48 pages.

* cited by examiner

*Primary Examiner* — Michael L Leonard
(74) *Attorney, Agent, or Firm* — RatnerPrestia

(57) ABSTRACT

The present invention relates to a polymer composition comprising a polymeric matrix and particles of an impact modifier within the polymeric matrix, wherein the impact modifier comprises at least one urethane group and the impact modifier is obtainable by reacting in situ within the polymeric matrix a) a polyol comprising a dimer fatty residue; and b) a polyisocyanate. The invention also relates to a method of making the polymer composition.

15 Claims, No Drawings

POLYMER COMPOSITION COMPRISING AN IMPACT MODIFIER AND METHOD OF MAKING THE SAME

CROSS REFERENCE TO RELATED APPLICATIONS

This application is the National Stage filing of International Appln. No. PCT/GB2016/053410, filed Nov. 3, 2016, and claims priority of GB Application No. 1522585.7, filed Dec. 22, 2015, the entirety of which applications is incorporated herein by reference for all purposes.

FIELD OF INVENTION

The present invention relates to a polymer composition comprising an impact modifier, a method of making the polymer composition and the use of a polyol comprising a dimer fatty residue to form particles of impact modifier within a polymeric matrix.

BACKGROUND

Impact modifiers are widely used to improve the impact strength of polymer compositions such as thermoplastics and thermosets. The aim of the impact modifier is to compensate for notch sensitivity, crack propagation and/or brittleness in the polymer composition, which may occur at ambient temperature and especially at sub-zero temperatures.

An example of an impact modified polymer is a polymer composition whose impact resistance and toughness have been increased by the introduction of microscopic impact modifier particles into the polymeric matrix that can absorb the energy of an impact or dissipate it and thereby improve the impact strength of the polymer composition.

Polylactic acid (PLA) is an example of a brittle polymer for which impact modifiers have been used. The brittleness of pure PLA polymer limits its use when compared with commonly used plastics. For example, engineering plastics for injection moulding require impact strength, and plastic films require tear strength. Furthermore a pure PLA film may produce a crackling sound when handled due to its brittleness and this may be undesirable in certain applications.

SUMMARY OF THE INVENTION

The present invention is based in part on the recognition by the applicant that an improved polymer composition is obtainable by forming particles of a urethane impact modifier in-situ within a polymeric matrix. This improved polymer composition may be made by blending a polyol comprising a dimer fatty residue with the polymeric matrix. The blending may be such that the polyol is dispersed within the polymeric matrix. Without being bound by theory, it is believed that the low polarity of the polyol due to the dimer residue will cause the polyol to phase separate within the polymeric matrix. This phase separation may cause the polyol to form dispersed particles within a continuous polymeric matrix. A polyisocyanate added to the polymer composition will then react with the polyol particles to form urethane impact modifier particles in-situ within the polymeric matrix.

Viewed from a first aspect, the present invention provides a polymer composition comprising a polymeric matrix and particles of an impact modifier within the polymeric matrix, wherein the impact modifier comprises at least one urethane group and the impact modifier is obtainable by reacting in situ within the polymeric matrix:
  a) a polyol comprising a dimer fatty residue; and
  b) a polyisocyanate.

Viewed from a second aspect, the present invention provides a method of making a polymer composition comprising the steps of:
  blending a polyol comprising a dimer fatty residue with a polymeric matrix to form phase-separated particles of the polyol within the polymeric matrix;
  blending a polyisocyanate with the polymeric matrix; and
  forming particles of an impact modifier within the polymeric matrix by reaction of the polyol with the polyisocyanate, wherein the impact modifier comprises at least one urethane group.

Viewed from a third aspect, the present invention provides a polymer composition obtained by a method according to the second aspect.

Viewed from a fourth aspect, the present invention provides a panel, film, sheet or injection-moulded article comprising a polymer composition according to the first or third aspect.

Viewed from a fifth aspect, the present invention provides an adhesive, coating or coated article comprising a polymer composition according to the first or third aspect.

Viewed from a sixth aspect, the present invention provides the use of a polyol comprising a dimer fatty residue to form particles of impact modifier within a polymeric matrix by reacting within the polymeric matrix the polyol and a polyisocyanate.

Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the present invention are obtained from natural sources. Such chemicals typically include a mixture of chemical species due to their natural origin. Due to the presence of such mixtures, various parameters defined herein can be an average value and may be non-integral.

The term 'particle' refers to a discrete entity and does not limit the state of the entity. For example, a particle could be a solid particle or a liquid particle.

The term 'polyor' is well known in the art, and refers to a molecule comprising more than one hydroxyl group. It will be understood that a polyol may also comprise one or more primary amine groups instead of hydroxyl groups, which will form urea instead of urethane bonds when reacted with isocyanate. Preferably the polyol comprises at least two hydroxyl groups. Preferably the polyol does not comprise a primary amine group.

The term 'dimer fatty acid' (also referred to as 'dimer fatty diacid') is well known in the art and refers to the dimerisation product of mono- or polyunsaturated fatty acids and/or esters thereof. Dimer fatty acids are described in T. E. Breuer, 'Dimer Acids', in J. I. Kroschwitz (ed.), Kirk-Othmer Encyclopedia of Chemical Technology, 4th Ed., Wiley, New York, 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

Preferred dimer fatty acids are dimers of C10 to C30, more preferably C12 to C24, particularly C14 to C22, and especially C18 fatty acids. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed. Preferably the dimer fatty residues used in the invention are hydrogenated.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Particularly preferred dimer fatty residues, used to form the polyol component of the polyurethane according to the present invention, have a dicarboxylic (or dimer) content of greater than 60%, more preferably greater than 70%, particularly greater than 80%, and especially greater than 90% by weight. The dimer fatty residues may have a dimer content of up to 99.9% by weight. The trimer content is preferably less than 20%, more preferably in the range from 0.1 to 10%, particularly 0.1 to 8%, and especially 0.1 to 6% by weight. The monomer content is preferably less than 10%, more preferably in the range from 0.5 to 5%, particularly 1 to 4%, and especially 2 to 3% by weight. All of the above % by weight values are based on the total weight of trimer, dimer and monomer present.

A dimer fatty acid may be converted to a dimer fatty diol as is known in the art. For example, a dimer fatty diol may be formed by hydrogenation of the corresponding dimer fatty acid. A dimer fatty diol may have properties as described herein with regard to a dimer fatty diacid except that the acid groups in the dimer fatty diacid are replaced with hydroxyl groups in the dimer fatty diol. The dimer fatty diol may be hydrogenated. The dimer fatty diol may be non-hydrogenated. In a similar manner, a trimer fatty triacid may be converted to a trimer fatty triol which may have properties as described herein with regard to a trimer fatty triacid. A dimer fatty diol is available ex Croda under the trade name "Pripol 2033".

A dimer fatty acid may be converted to a dimer fatty diamine as is known in the art. A dimer fatty diamine may have properties as described herein with regard to a dimer fatty acid except that the acid groups in the dimer fatty acid are replaced with amine groups in the dimer fatty diamine. The dimer fatty diamine may be hydrogenated. The dimer fatty diamine may be non-hydrogenated. In a similar manner, a trimer fatty triacid may be converted to a trimer fatty triamine which may have properties as described herein with regard to a trimer fatty triacid. Dimer fatty diamines are available ex Croda under the trade names "Priamine 1074" and "Priamine 1075".

The term 'dimer fatty residue' as used herein, unless otherwise defined, refers to a residue of a dimer fatty acid (also referred to as a dimer fatty diacid) or a residue of a dimer fatty diacid derivative such as a dimer fatty diol, a dimer fatty diamine, a dimer di-isocyanate and/or a dimer diacrylate.

Impact Modifier

The impact modifier comprises a polyol and a polyisocyanate as reactants. The impact modifier may optionally comprise a chain extender. The impact modifier may consist of a polyol and a polyisocyanate. The impact modifier may consist of a polyol, a polyisocyanate and a chain extender.

The impact modifier is obtainable by reaction of its reactants in situ within the polymeric matrix. Preferably, the impact modifier is obtained by reaction in situ within the polymeric matrix. The impact modifier may be obtainable and/or obtained by a method according to the second aspect of the invention. Obtaining impact modifier particles by reaction in situ within the polymeric matrix may be advantageous. Without being bound by theory, such impact modifier particles may be better distributed within the polymeric matrix or more strongly held within the polymeric matrix than impact modifier particles formed outside the polymeric matrix and subsequently mixed with the polymeric matrix. Obtaining impact modifier particles by reaction in-situ may result in one or more improved physical properties of the polymer composition such as elongation at break or unnotched impact strength.

The polyol may be selected to be phase incompatible with the polymeric matrix. This may cause the polyol to phase separate when mixed with the polymeric matrix. The phase incompatibility and/or phase separation may be due to a difference in polarity between the polyol and the polymeric matrix. The polyol may form discrete domains and/or particles within the polymeric matrix. The polyol particles may be liquid. This may be advantageous since the polyisocyanate may then react with the polyol particles or domains within the polymeric matrix to form impact modifier particles in situ within the polymeric matrix. The impact modifier particles may be solid.

Preferably, the impact modifier is obtainable and/or obtained by forming phase-separated particles of the polyol within a continuous phase of the polymeric matrix and reacting the polyol with the polyisocyanate.

The particles of the impact modifier may be identifiable within the polymeric matrix using various methods. Preferably the particles of impact modifier are identifiable using electron microscopy. The particle size of the impact modifier particles may be measurable using electron microscopy. Preferably the average diameter of the impact modifier particles is measurable by inspection of an image obtained by electron microscopy The impact modifier particles may have an average diameter of at least 0.05 µm, preferably at least 0.1 µm, more preferably at least 0.5 µm. The impact modifier particles may have an average diameter of at most 50 µm, preferably at most 20 µm, more preferably at most 10 µm, particularly preferably at most 6 µm. Preferably the particles of impact modifier have an average diameter of 0.1 to 10 µm which is measurable by inspection of an image obtained by electron microscopy.

The size distribution of the impact modifier particles may have a significant effect on the final properties of the polymer composition. In a preferred embodiment of the invention, suitably at least 50%, preferably at least 60%, more preferably at least 70%, particularly at least 80%, and especially at least 85% by number of impact modifier particles have a particle diameter within the above preferred ranges given for the average particle diameter.

The impact modifier preferably has a glass transition temperature ($T_g$) measured by differential scanning calorimetry (DSC) using a Model DSC822 from Mettler Toledo in the range from −65 to −10° C., more preferably −50 to −10° C., particularly preferably −45 to −15° C.

The impact modifier comprises at least one urethane group, preferably at least two urethane groups, more preferably at least 3 urethane groups, particularly preferably at least 4 urethane groups. The impact modifier may comprise at most 10 urethane groups, preferably at most 8 urethane groups.

Polyol

The impact modifier comprises a polyol. The polyol comprises a dimer fatty residue. The presence of the dimer fatty residue in the polyol may make it more hydrophobic and increase its potential to phase separate in the polymeric matrix. Phase separation may occur due to a difference in the polarity of the polyol and the polymeric matrix. Phase separation may result in the polyol forming particles (for example, liquid particles) within the polymeric matrix.

The particles of the polyol may be identifiable within the polymeric matrix using various methods. Preferably the particles of polyol are identifiable using electron microscopy. The particle size of the polyol particles may be measurable using electron microscopy. Preferably the average diameter of the polyol particles is measurable by inspection of an image obtained by electron microscopy The polyol particles may have an average diameter of at least 0.05 μm, preferably at least 0.1 μm, more preferably at least 0.5 μm. The polyol particles may have an average diameter of at most 50 μm, preferably at most 20 μm, more preferably at most 10 μm, particularly preferably at most 6 μm. Preferably the particles of polyol have an average diameter of 0.1 to 10 μm which is measurable by inspection of an image obtained by electron microscopy.

The polyol may comprise at least 10 wt % dimer fatty residue, preferably at least 20 wt %, more preferably at least 30 wt %, especially preferably at least 40 wt %. The polyol may comprise at most 100 wt % dimer fatty residue, preferably at most 90 wt %, more preferably at most 80 wt %. Preferably the polyol comprises 20 to 100 wt % of dimer fatty residue based on the total weight of the polyol. In terms of reactants, the polyol may comprise 20 to 100 wt % of dimer fatty diacid, dimer fatty diol and/or dimer fatty diamine, preferably dimer fatty diacid and/or dimer fatty diol.

The dimer fatty residue may be a dimer diacid residue, a dimer diol residue, a dimer diamine residue, a dimer diisocyanate residue and/or a dimer diacrylate residue. Preferably the dimer fatty residue is a dimer diacid residue, a dimer diol residue, a dimer diamine residue and/or a dimer diisocyanate residue. More preferably the dimer fatty residue is a dimer diacid residue, a dimer diol residue and/or a dimer diamine residue. Particularly preferably the dimer fatty residue is a dimer diacid residue and/or a dimer diol residue. Preferably the polyol comprises from 20 to 100 wt % dimer fatty residue and the dimer fatty residue is selected from dimer diacid residue and/or dimer diol residue.

The polyol may also comprise one or more non-dimeric dicarboxylic acids (hereinafter referred to as non-dimeric diacids). The non-dimeric diacids may be aliphatic or aromatic, and include dicarboxylic acids and their esters, preferably alkyl esters, thereof. Preferably the non-dimeric diacids are linear dicarboxylic acids having terminal carboxyl groups and a connecting carbon chain in the range from 2 to 20, more preferably 6 to 12 carbon atoms. Examples of such non-dimeric diacids are phthalic acid, terephthalic acid, isophthalic acid, succinic acid, adipic acid, glutaric acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Succinic acid, adipic acid, and/or sebacic acid are particularly preferred.

The polyol may comprise at least 10 wt % non-dimeric diacid, preferably at least 20 wt %. The polyol may comprise at most 80 wt % non-dimeric diacid, preferably at most 60 wt %, more preferably at most 40 wt %, particularly preferably at most 25 wt %.

The polyol may also comprise non-dimeric diols. Suitable non-dimeric diols include straight chain aliphatic diols such as ethylene glycol, diethylene glycol, 1,3-propylene glycol, dipropylene glycol, 1,4-butylene glycol, 1,6-hexylene glycol, branched diols such as neopentyl glycol, 3-methyl pentane glycol, 1,2-propylene glycol, and cyclic diols such as 1,4-bis(hydroxymethyl)cyclohexane and (1,4-cyclohexane-dimethanol). 1,4-butylene glycol, 1,6-hexylene glycol, neopentyl glycol, 3-methyl pentanediol and/or diethylene glycol are preferred diols.

The polyol may comprise at least 10 wt % non-dimeric diol, preferably at least 20 wt %. The polyol may comprise at most 80 wt % non-dimeric diol, preferably at most 60 wt %, more preferably at most 40 wt %, particularly preferably at most 25 wt %.

Preferably, the polyol is an oligomeric or polymeric polyol, more preferably a polymeric polyol. The polyol may comprise at least two ester groups. Preferably, the polyol is a polyester polyol. For example, the polyol may be a polyester polyol available from the PRIPLAST (TM) range supplied by Croda.

Preferably, the polyol comprises at least two hydroxyl groups. The polyol may comprise at most 6 hydroxyl groups, preferably at most 5, more preferably at most 4, yet more preferably at most 3.

The polyol preferably has a molecular weight (number average) in the range from 800 to 6,000, more preferably 900 to 3,000, particularly 1,000 to 2,500, and especially 1,400 to 2,400 g/mol. This may be calculated as described under Test Methods.

The polyol preferably has a glass transition temperature (Tg) measured by differential scanning calorimetry (DSC) using a Model DSC822 from Mettler Toledo in the range from −75 to 0° C., more preferably −70 to −5° C., particularly −70 to −35° C., and especially −65 to −45° C.

The polymer composition may comprise at least 1 wt % polyol, preferably at least 2 wt %, more preferably at least 5 wt %, particularly preferably at least 10 wt %. The polymer composition may comprise at most 30 wt % polyol, preferably at most 25 wt %, more preferably at most 20 wt %, particularly preferably at most 15 wt %. Preferably the polymer composition comprises from 1 to 20 wt % polyol.

Polyisocyanate

The impact modifier comprises a polyisocyanate. The polyisocyanate may be a diisocyanate. The polyisocyanate may function as a cross-linking agent.

The impact modifier may comprise at least 0.5 wt % polyisocyanate, preferably at least 2 wt %, more preferably at least 5 wt %, particularly preferably at least 10 wt %. The impact modifier may comprise at most 90 wt % polyisocyanate, preferably at most 80 wt %, more preferably at most 70 wt %, particularly preferably at most 50 wt %.

Preferably the polyisocyanate is aromatic. The aromatic polyisocyanate may be selected from tolylene diisocyanate, m-phenylene diisocyanate, p-phenylene diisocyanate, xylylene diisocyanate, 4,4'-diphenylmethane diisocyanate (MDI), 2,4'-diphenylmethane diisocyanate, polymethylene-polyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as hydrogenated MDI (4,4'-Methylenebis(cyclohexyl isocyanate)) and uretonimine-modified compounds thereof.

The polyisocyanate may be aliphatic. The aliphatic polyisocyanate may be selected from isophorone diisocyanate and hexamethylene diisocyanate The polyisocyanate may be ethylenically saturated.

An aromatic polyisocyanate may react more quickly than an aliphatic polyisocyanate which may be advantageous when forming the impact modifier in-situ within the polymeric matrix.

The polymer composition may comprise at least 0.1 wt % polyisocyanate, preferably at least 0.5 wt %, more preferably at least 1 wt %, yet more preferably at least 2 wt %. The impact modifier may comprise at most 30 wt % polyisocyanate, preferably at most 20 wt %, more preferably at most 10 wt %, particularly preferably at most 5 wt %. Preferably, the polymer composition comprises from 0.1 to 10 wt % polyisocyanate.

Optional Chain Extender

The impact modifier may comprise an optional chain extender. Alternatively the impact modifier may be formed without a chain extender.

The optional chain extender may comprise a compound having 2 or more active hydrogen groups, preferably amine or hydroxyl groups. The chain extender may have a low molecular weight, for example a number average molecular weight of 1 to 1000 g/mol.

In this invention, amine-functional chain extenders are preferred since hydroxyl-functional chain extenders may interact undesirably with the polymeric matrix. For example if the polymeric matrix is a polyester such as polylactic acid (PLA) then a hydroxyl (e.g. diol) chain extender may transesterify with the polymeric matrix and break down its high molecular weight.

Examples of amine-functional chain extenders are:
(i) one or more aliphatic diamines with the number of carbon atoms in the chain of at least 2, whereby the amino groups are preferably at the terminal ends of the carbon chain. The aliphatic diamines may contain up to 20 carbon atoms and the aliphatic chain may be essentially linear or branched. The most preferred aliphatic diamines are 1,2-ethane diamine, 1,4-butane diamine, 1,6-hexamethylene diamine, 1,8-diamino octane or 1,12-diamino dodecane;
(ii) one or more cyclic diamines and/or heterocyclic diamines. Examples for cyclic (aliphatic) diamines or heterocyclic diamines are cyclohexanediamine, 4,4'-diamino-dicyclohexyl-methane, xylenediamine, piperazine, cyclohexanebis(methylamine), isophorone diamine, dimethylpiperazine and dipiperidylpropane,
(iii) dimer diamines (e.g. Priamine™, ex Croda)

The chain extender may comprise a dimer diamine. Dimer diamine may be advantageous since it may have a polarity similar to the polyol due to the presence of the dimer residue.

The polymer composition may comprise from 0.01 to 1 wt % chain extender, more preferably 0.05 to 0.35 wt %.

Further Optional Impact Modifier Components

The impact modifier may optionally contain other additives such as urethane promoting catalysts and stabilizers.

Suitable catalysts are the normal polyurethane catalysts such as compounds of divalent and tetravalent tin, more particularly the dicarboxylates of divalent tin and the dialkyl tin dicarboxylates and dialkoxylates. Examples include dibutyl tin dilaurate, dibutyl tin diacetate, dioctyl tin diacetate, dibutyl tin maleate, tin(II) octoate, tin(II) phenolate, and the acetyl acetonates of divalent and tetravalent tin. In addition, tertiary amines or amidines may also be employed, either alone or in combination with the aforementioned tin compounds. Examples of amines include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether, dimethyl piperazine, and mixtures thereof.

Suitable stabilizers include materials which stabilize the viscosity of the polyurethane during its production, storage and application, and include monofunctional carboxylic acid chlorides, monofunctional highly reactive isocyanates, and non-corrosive inorganic acids. Examples of such stabilizers are benzoyl chloride, toluene sulfonyl isocyanate, phosphoric acid or phosphorous acid. In addition, suitable hydrolysis stabilizers include for example the carbodiimide type. Stabilizers which are antioxidants or UV absorbers may also be used. Examples of such stabilizers are HALS hindered amine light stabilisers, hydrogen-donating antioxidants such as hindered phenols and secondary aromatic amines, benzofuranone, oxanilides, benzophenones, benzotriazoles and UV absorbing pigments.

Polymeric Matrix

The polymeric matrix may form a continuous phase in the polymer composition. The polymeric matrix may be selected to have a different polarity to the polyol. Without being bound by theory, this polarity difference may cause the polyol to phase separate when added to the polymeric matrix. The polyol and/or impact modifier may form a discrete phase within the polymeric matrix. This discrete phase may be in the form of particles.

The polymeric matrix may be a condensation polymer. Preferably the polymeric matrix is selected from polyesters, polycarbonates, polyamides, and copolymers or mixtures thereof. The polymeric matrix may be a polyester. A polyester may advantageously have a suitable polarity difference to a polyol which comprises a dimer residue.

Preferably the polymeric matrix is selected from polylactic acid (PLA—also known as polylactide), polyethylene terephthalate (PET), polybutylene terephthalate (PBT), polycaprolactone (PCL), polybutylene succinate (PBS), polyethylene furanoate (PEF), and copolymers or mixtures thereof.

The polymeric matrix may comprise polylactic acid (PLA). The polylactic acid may comprise poly-L-lactic acid (PLLA). The polylactic acid may comprise poly-D-lactic acid (PDLA). Preferably the polylactic acid comprises at least 70 wt % PLLA, more preferably at least 80 wt %, even more preferably at least 90 wt %, particularly preferably at least 95 wt %.

Preferably the polyisocyanate reacts with the polyol and with the polymeric matrix (e.g. when these components are mixed). This may advantageously bond (e.g. covalently bond) the impact modifier particles to the polymeric matrix. Free isocyanate groups in the polyisocyanate may react with the polymeric matrix. For example, if the polymeric matrix is a polyester then the polyisocyanate may react with a free hydroxyl group at the end of a polyester chain.

Method of Making the Polymer Composition

Viewed from the second aspect, the present invention provides a method of making a polymer composition comprising the steps of:

blending a polyol comprising a dimer fatty residue with a polymeric matrix to form phase-separated particles of the polyol within the polymeric matrix;

blending a polyisocyanate with the polymeric matrix; and forming particles of impact modifier within the polymeric matrix by reaction of the polyol with the polyisocyanate, wherein the impact modifier comprises at least one urethane group.

The polyol and the polyisocyanate may be blended with the polymeric matrix at the same time or at separate times. Preferably the polyol is blended with the polymeric matrix in a first step. Preferably the polyisocyanate is blended with the polymeric matrix in a second step. The first step may be a mixing or extrusion step. The second step may be a mixing or extrusion step, preferably a reactive extrusion step. The first and second steps may be performed in a continuous process.

Preferably the polyisocyanate reacts with the polyol and with the polymeric matrix during the method.

Physical Properties of the Polymer Composition

The polymer composition may be transparent or opaque white to yellow. Alternatively, the polymer composition may include a pigment. Suitable pigments include inorganic pigments such as transition metal salts; organic pigments such as azo compounds; and carbon powder. Further additives in the polymer composition may include rheology modifiers and/or fillers such as silica and carbonates.

The polymer composition may have an elastic (E) modulus measured according to ISO 527 using a tensile tester of at least 1000 MPa, preferably at least 1500 MPa, more preferably at least 2000 MPa, particularly preferably at least 2500 MPa. The polymer composition may have an elastic (E) modulus of at most 6000 MPa, preferably at most 5500 MPa, more preferably at most 5000 MPa, particularly preferably at most 4500 MPa.

The polymer composition may have an elongation at break measured according to ISO 527 using a tensile tester of at least 10%, preferably at least 20%, more preferably at least 30%, particularly preferably at least 40%. The polymer composition may have an elongation at break of at most 200%, preferably at most 150%, more preferably at most 125%, particularly preferably at most 100%.

The polymer composition may have an unnotched impact strength measured according to ISO 179 of at least 20 kJ/m$^2$, preferably at least 30 kJ/m$^2$, more preferably at least 35 kJ/m$^2$, particularly preferably at least 40 kJ/m$^2$. The polymer composition may have an unnotched impact strength of at most 100 kJ/m$^2$, preferably at most 90 kJ/m$^2$, more preferably at most 80 kJ/m$^2$.

The ratio of the elongation at break of the polymer composition to the elongation at break of the polymeric matrix (i.e. comparing the elongation of the polymeric matrix including impact modifier particles with the elongation of the pure polymeric matrix) may be at least 2:1, preferably at least 5:1, more preferably at least 10:1, particularly preferably at least 20:1. The ratio of the elongation at break of the polymer composition to the elongation at break of the polymeric matrix may be at most 100:1, preferably at most 80:1, more preferably at most 60:1.

The ratio of the unnotched impact strength of the polymer composition to the unnotched impact strength of the polymeric matrix (i.e. comparing the unnotched impact strength of the polymeric matrix including impact modifier particles with the unnotched impact strength of the pure polymeric matrix) may be at least 1.5:1, preferably at least 2:1, more preferably at least 2.5:1, even more preferably at least 3:1, particularly preferably at least 4:1. The ratio of the elongation at break of the polymer composition to the elongation at break of the polymeric matrix may be at most 10:1, preferably at most 8:1.

Preferably the polymer composition has an elongation at break of at least 10% and/or an unnotched impact strength of at least 35 kJ/m$^2$.

Articles made from the Polymer Composition

The polymer composition may be formed into an article by known methods. Examples of such methods are milling, calendering, extruding (extrusion or coextrusion), casting, injection moulding, extrusion blow moulding and foaming.

The polymer composition may be suitable for the manufacture of hollow articles (bottles, flasks and jars), films, sheets, pipes, foam materials, panels and/or profiled materials. The polymer composition may be suitable as a resin for the manufacture of adhesives and coatings.

Viewed from a further aspect, the present invention provides a panel, film, sheet or injection-moulded article comprising a polymer composition according to the invention.

Viewed from a further aspect, the present invention provides an adhesive, coating or coated article comprising a polymer composition according to the invention.

Any or all of the disclosed features, and/or any or all of the steps of any method or process described, may be used in any aspect of the invention.

EXAMPLES

The invention is illustrated by the following non-limiting examples.

It will be understood that all test procedures and physical parameters described herein have been determined at atmospheric pressure and room temperature (i.e. about 20° C.), unless otherwise stated herein, or unless otherwise stated in the referenced test methods and procedures. All parts and percentages are given by weight unless otherwise stated.

Compounds used in the following Examples are identified as follows:

Methylene diphenyl diisocyanate (MDI)—aromatic polyisocyanate

Polymeric MDI (p-MDI) ex Sigma Aldrich

Desmodur (TM) N3600—aliphatic polyisocyanate (HDI trimer) ex Bayer MaterialScience/Covestro.

Desmodur (TM) N3900—aliphatic polyisocyanate (based on HDI) ex Bayer MaterialScience/Covestro.

Priplast (TM) 3199—polyester polyol containing dimer fatty acid ex Croda

Synterra (TM) 1510—Poly-L-lactic acid (PLLA, very low D-lactide; high molecular weight extrusion grade) ex Synbra Synterra (TM) 1505—Polylactic acid (95% L, 5% D PLA) ex Synbra Synterra (TM) 2011—Poly-L-lactic acid (PLLA, low D-lactide) ex Synbra Natureworks 6202D (NW6202)—Poly-L-lactic acid (PLLA) ex NatureWorks Test Methods In this specification, the following test methods have been used:

(i) Elastic (E) modulus, Elongation at break and Tensile strength were measured according to ISO 527 using a Zwick Z010 all round line 10 kN tensile tester. Samples were prepared according to ISO 527-2 and tested according to ISO 527-1. Test speed of 10 mm/min. E-modulus speed 1 mm/min.

(ii) Impact strength, Charpy notched and unnotched, were measured according to ISO 179 using a Ceast impact tester. Samples were prepared according to ISO 294-1. Maximum energy 4J.

(iii) Scanning Electron Microscopy (SEM) pictures were taken using a FEI Magellan 400, at an electron energy of 2 kV by cryogenic fracture of samples and optional plasma etching of the surface.

(iv) Number average molecular weight was determined by end group analysis with reference to the hydroxyl value.

(v) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

Example 1

Two different PLA (polylactic acid/polylactide) polymer compositions (Synterra 1510 and Natureworks 6202D) were investigated.

In a first step, Priplast 3199 polyol was melt blended in different amounts with each PLA polymer composition via extrusion. From SEM pictures it is visible that the polyol is present in uniform particles as a second phase in the PLA polymeric matrix. The second phase polyol particles had a diameter of 0.5 to 6 μm which was measured by inspection of SEM pictures taken using a FEI Magellan 400, at an electron energy of 2 kV by cryogenic fracture of samples.

In a second step, these different polyol/PLA blends were then processed in a Haakke Rheocord kneader with addition of different amounts of polymeric MDI (p-MDI) aromatic polyisocyanate for in-situ polyurethane formation. The resulting materials were impact modified polymer compositions comprising a PLA polymeric matrix and polyurethane impact modifier particles.

Example 2

The mechanical properties of materials made in Example 1 were determined and the results are given in Table 1.

TABLE 1

| | Composition | | | | Tensile properties | | Impact strength | |
|---|---|---|---|---|---|---|---|---|
| Sample | PLA grade | Polyol (wt %) | Polyisocyanate (wt %) | E-modulus (MPa) | Elongation at break (%) (Av/Upper) | | Unnotched (kJ/m$^2$) | Notched (kJ/m$^2$) |
| PLA1 | Synterra 1510 | 0 | 0 | 3496 | 4.04 | | 17.1 | 1.88 |
| PLA2 | NW 6202 | 0 | 0 | 3411 | 3.96 | | 16.0 | 1.94 |
| PP1 | Synterra 1510 | 3.37 | 0 | 3414 | 6.21 | | 17.2 | 2.75 |
| PP2 | Synterra 1510 | 5.26 | 0 | 3187 | 30.1 | | 23.9 | 3.09 |
| PP3 | Synterra 1510 | 9.57 | 0 | 2960 | 3.27 | | 37.9 | 5.63 |
| PP4 | NW 6202 | 1.67 | 0 | 3336 | 3.54 | | 16.9 | 2.84 |
| PP5 | NW 6202 | 4.41 | 0 | 3199 | 4.78 | | 24.6 | 3.56 |
| PP6 | NW 6202 | 5.88 | 0 | 2820 | 2.76 | | 19.8 | 3.47 |
| PU1 | Synterra 1510 | 9.57 | 1.4 | 2689 | 38/173 | | 82.1 | 9.97 |
| PU2 | Synterra 1510 | 9.57 | 2.9 | 2679 | 82.7/205 | | 99.9 (no break) | 20.06 |
| PU3 | Synterra 1510 | 9.57 | 4.4 | 2649 | 87.9/200 | | 82.0 | 12.56 |
| PU4 | Synterra 1510 | 9.57 | 5.9 | 2606 | 123/165 | | 89.0 | 14.22 |
| PU5 | Synterra 1510 | 9.57 | 7.3 | 2583 | 77.4/192 | | 99.9 (no break) | 11.78 |

The results in Table 1 show that the combination of polyol and polyisocyanate via in-situ polyurethane formation within a PLA polymeric matrix results in samples according to the invention (PU1 to PU5) with an elongation and notched & unnotched impact strength far greater than neat PLA samples (PLA1 & PLA2). The elastic (E) modulus of PU1 to PU5 also remains above 2000 MPa.

Comparative samples PLA1 and PLA2 are the pure polymer composition with no added polyol and no added polyisocyanate.

Comparative samples PP1 to PP6 (with no added polyisocyanate) demonstrate that addition of polyol (up to 10% wt) without reaction with isocyanate (thus no polyurethane), gives some increase in impact strength with increasing polyol content. This can be related to the Priplast polyol being present in a second phase within the polymeric matrix and absorbing some impact. However, mechanical properties are not improved as seen by remaining low value of elongation at break, at 3 to 6%.

Samples PU1 to PU5 according to the invention demonstrate a significant increase in impact strength, when in-situ polyurethane has been formed from Priplast polyol plus isocyanate. Without being bound by theory, some isocyanate may additionally react with free hydroxyl groups of the PLA polymer, giving covalent bonding of the polyurethane to the PLA matrix. The improved impact strength is combined with an improvement of elongation at break, while the elastic (E) Modulus (stiffness) is largely maintained. This demonstrates that the modification with in-situ formed polyurethane brings toughness to the PLA. Due to a larger deviation in the results of elongation at break of these samples PU1 to PU5, both an average value (Av) and the highest value measured are reported (Upper). This deviation can be related to imperfections in the samples tested which result in lower elongation than the maximum material property.

Example 3—Comparative

In a kneader, PLA is melted. This is followed by addition of isocyanate (p-MDI), without addition of polyol. The material did not yield an improvement in impact strength or tensile properties.

Example 4

In an extruder, PLA (Synterra 1510) is melted and Priplast 3199 polyol is added in a first step, with a first mixing element designed to achieve proper mixing of the polyol into the PLA. Subsequently, polyisocyanate is added for in-situ reaction with the polyol, with a second mixing element in the extruder to achieve proper mixing of the polyisocyanate. Using two mixing elements in the extruder allows the first and second steps in the method to be performed in a single continuous process.

This experiment was made with aliphatic (Desmodur N3600 and N3900) polyisocyanate (results in Table 2), and can be compared with the aromatic (p-MDI) polyisocyanate results PU1 to PU5 in Table 1.

Example 5

The mechanical properties of materials in Example 4 were determined and the results are given in Table 2.

These samples (PU6 to PU16) demonstrate that a high modulus is largely maintained with enhanced maximum elongation (elongation at break about 10-30% versus 4% for unmodified PLA). The impact strength is improved as demonstrated by the unnotched impact strength (40-50 kJ/m$^2$ versus 17 kJ/m$^2$ for unmodified PLA). A higher molar equivalent ratio of isocyanate (NCO) results in an improvement in the impact modification.

As compared with Example 2 (results PU1 to PU5 in Table 1), the improvement in the impact modification with these aliphatic isocyanates was found not as large as with aromatic p-MDI isocyanate. This may be related to the lower reactivity of aliphatic isocyanates, whereby less of the isocyanate is expected to have reacted with the polyol. Any remaining isocyanate will react with moisture, since the PLA polymer composition is quenched and granulated by passing through a water bath.

Example 6

As in Example 4, PLA is modified by an extrusion process with in-situ formed polyurethane impact modifier. The process is scaled up to produce 130 kg of impact-modified Synterra 1505 toughened with 10 wt % Priplast 3199 and 2.4 wt % p-MDI. Mechanical performance was tested (Sample PUx1-Table 3).

As in Example 4, PLA is modified by an extrusion process with in-situ formed polyurethane impact modifier. The process is scaled up to produce 50 kg of impact-modified Synterra 2011, toughened with 10 wt % Priplast 3199 and 2.4 wt % p-MDI. Mechanical performance was tested (Sample PUx2-Table 3). A small part of this material was annealed by placing dog-bones in an oven at 115° C. for 1 hour, mimicking the process of injecting moulding (Sample PUx2 Annealed).

TABLE 3

| Sample | PLA grade | Tensile properties | | Impact strength | |
|---|---|---|---|---|---|
| | | E-modulus (MPa) | Elongation at break (%) | Unnotched (kJ/m$^2$) | Notched (kJ/m$^2$) |
| PUx1 | Synterra 1505 | 2668 | 27.3 | 49.1 | 3.8 |
| PUx2 | Synterra 2011 | 2643 | 24.3 | 51.2 | 6.0 |

TABLE 2

| | Composition | | | Tensile properties | | Impact strength |
|---|---|---|---|---|---|---|
| Sample | Polyol (wt %) | Desmodur Grade of polyIsocyanate | NCO molar equivalent ratio vs polyol | E-modulus (MPa) | Elongation at break (%) | Unnotched (kJ/m$^2$) |
| PU6 | 5 | N3600 | 0.75 | 3035 | 9.3 | 49.8 |
| PU7 | 7.5 | N3600 | 0.75 | 2809 | 13.8 | 40.9 |
| PU8 | 7.5 | N3600 | 0.95 | 2748 | 15.0 | 41.0 |
| PU9 | 10 | N3600 | 0.75 | 2640 | 22.5 | 46.8 |
| PU10 | 10 | N3600 | 0.95 | 2534 | 29.3 | 50.6 |
| PU11 | 5 | N3900 | 0.75 | 2988 | 10.5 | 46.4 |
| PU12 | 5 | N3900 | 0.95 | 2932 | 16.2 | 44.8 |
| PU13 | 7.5 | N3900 | 0.75 | 2828 | 13.9 | 34.9 |
| PU14 | 7.5 | N3900 | 0.95 | 2726 | 15.8 | 47.7 |
| PU15 | 10 | N3900 | 0.75 | 2567 | 18.8 | 39.9 |
| PU16 | 10 | N3900 | 0.95 | 2553 | 22.7 | 50.5 |

TABLE 3-continued

| Sample | PLA grade | Tensile properties | | Impact strength | |
|---|---|---|---|---|---|
| | | E-modulus (MPa) | Elongation at break (%) | Unnotched (kJ/m$^2$) | Notched (kJ/m$^2$) |
| PUx2 Annealed | Synterra 2011 | 3132 | 12.0 | 83.2 | 18.5 |

Synterra 1505 contains a relatively large amount of D-lactide resulting in less crystalline PLA. Synterra 2100 is of high L-lactide purity resulting in faster crystallisation. Annealing of this material (thereby increasing the crystallinity), results in a higher heat deflection temperature (HDT), which is preferred in an injection moulding process. It furthermore results in an improved E-modulus and a large improvement in impact strength.

Example 7

Samples PUx1 and PUx2 were successfully injection moulded into plastic panels. Sample PUx1 was successfully extruded and blown into plastic film (foil). The film blowing process was stable. The film had improved strength when compared with regular PLA film resulting in a significant improvement of the film tear strength when not pre-cut or notched. In addition, the film does not make the typical crackling (brittle) sound of regular PLA film.

It is to be understood that the invention is not to be limited to the details of the above embodiments, which are described by way of example only. Many variations are possible.

The invention claimed is:

1. A polymer composition comprising a polymeric matrix and particles of an impact modifier within the polymeric matrix, wherein the impact modifier comprises at least one urethane group and is obtained by reacting in situ within the polymeric matrix:
   a) a polyester polyol comprising a dimer fatty diacid; and
   b) an aromatic or aliphatic polyisocyanate,
wherein:
   the polymeric matrix comprises polylactic acid (PLA),
   the impact modifier is obtained by forming phase-separated particles of the polyol within a continuous phase of the polymeric matrix and then reacting the polyol with the polyisocyanate,
   the polyisocyanate reacts with the polyol and with the polymeric matrix,
   the polymer composition has an unnotched impact strength of at least 40 kJ/m$^2$ as measured by ISO 179 and an elongation at break of at least 10% as measured by ISO 527, and
   the polymer composition comprises 1 to 25 wt % of the polyol and 0.1 to 10 wt % of the polyisocyanate.

2. The polymer composition according to claim 1 wherein the polyol comprises from 20 to 100 wt % of the dimer fatty diacid.

3. The polymer composition according to claim 1 wherein the polymer composition comprises from 5 to 20 wt % of the polyol.

4. The polymer composition according to claim 1 wherein the polymer composition comprises from 2 to 10 wt % of the polyisocyanate.

5. The polymer composition according to claim 1 wherein the particles of impact modifier have an average diameter of 0.1 to 10 μm which is measured by inspection of an image obtained by electron microscopy.

6. The polymer composition according to claim 1 wherein the polymer composition has an elongation at break of at least 30%.

7. A method of making a polymer composition comprising the steps of:
   blending a polyester polyol comprising a dimer fatty diacid with a polymeric matrix to form phase-separated particles of the polyol within the polymeric matrix; and
   forming particles of an impact modifier within the polymeric matrix by then reacting the polyol with an aromatic or aliphatic polyisocyanate, wherein the impact modifier comprises at least one urethane group,
wherein:
   the polymeric matrix comprises a polylactic acid (PLA),
   the polyisocyanate reacts with the polyol and with the polymeric matrix,
   the polymer composition has an unnotched impact strength of at least 40 kJ/m$^2$ as measured by ISO 179 and an elongation at break of at least 10% as measured by ISO 527, and
   the polymer composition comprises 1 to 25 wt % of the polyol and 0.1 to 10 wt % of the polyisocyanate.

8. A polymer composition obtained by the method according to claim 7.

9. A panel, film, sheet or injection-moulded article comprising the polymer composition according to claim 1.

10. An adhesive, coating or coated article comprising the polymer composition according to claim 1.

11. The method according to claim 7 wherein the polyol comprises from 20 to 100 wt % of the dimer fatty diacid.

12. The method according to claim 7 wherein the polymer composition comprises from 5 to 20 wt % of the polyol.

13. The method according to claim 7 wherein the polymer composition comprises from 2 to 10 wt % of the polyisocyanate.

14. The method according to claim 7 wherein the particles of impact modifier have an average diameter of 0.1 to 10 μm which is measured by inspection of an image obtained by electron microscopy.

15. The method according to claim 7 wherein the polymer composition has an elongation at break of at least 30%.

* * * * *